United States Patent [19]

Sluiter et al.

[11] Patent Number: 4,903,428
[45] Date of Patent: Feb. 27, 1990

[54] FISHING JIGGER

[76] Inventors: Alexander V. Sluiter, 2242 Wiseman Court, Mississauga, Ontario, Canada, L5J 1P2; Richard J. Sluiter, 2079 Victoria Ave., Burlington, Ontario, Canada, L7R 1R5

[21] Appl. No.: 325,786

[22] Filed: Mar. 20, 1989

[30] Foreign Application Priority Data

Nov. 21, 1988 [CA] Canada .................................. 583621

[51] Int. Cl.⁴ ............................................. A01K 97/00
[52] U.S. Cl. ..................................... 43/26.1; 43/43.13
[58] Field of Search ..................... 43/26.1, 43.12, 43.13

[56] References Cited

U.S. PATENT DOCUMENTS 2,976,642  3/1961  Wickman et al. .................. 43/43.13
4,204,356  5/1980  Smith .................................... 43/26.1

Primary Examiner—M. Jordan
Attorney, Agent, or Firm—Jeffers, Hoffman & Niewyk

[57] ABSTRACT

A fishing jigger is shown having a paddle wheel rotatably mounted in a cavity of the jigger body about a transverse axis. A crank member is pivotally mounted on the paddle wheel eccentrically of the transverse axis and is reciprocated along a crank port by rotation of the paddle wheel induced by water impacting the paddles. A lure or bait attached to the crank member is thus jigged back and forth as the fishing jigger is pulled through the water thus increasing its appeal to a fish.

19 Claims, 6 Drawing Sheets

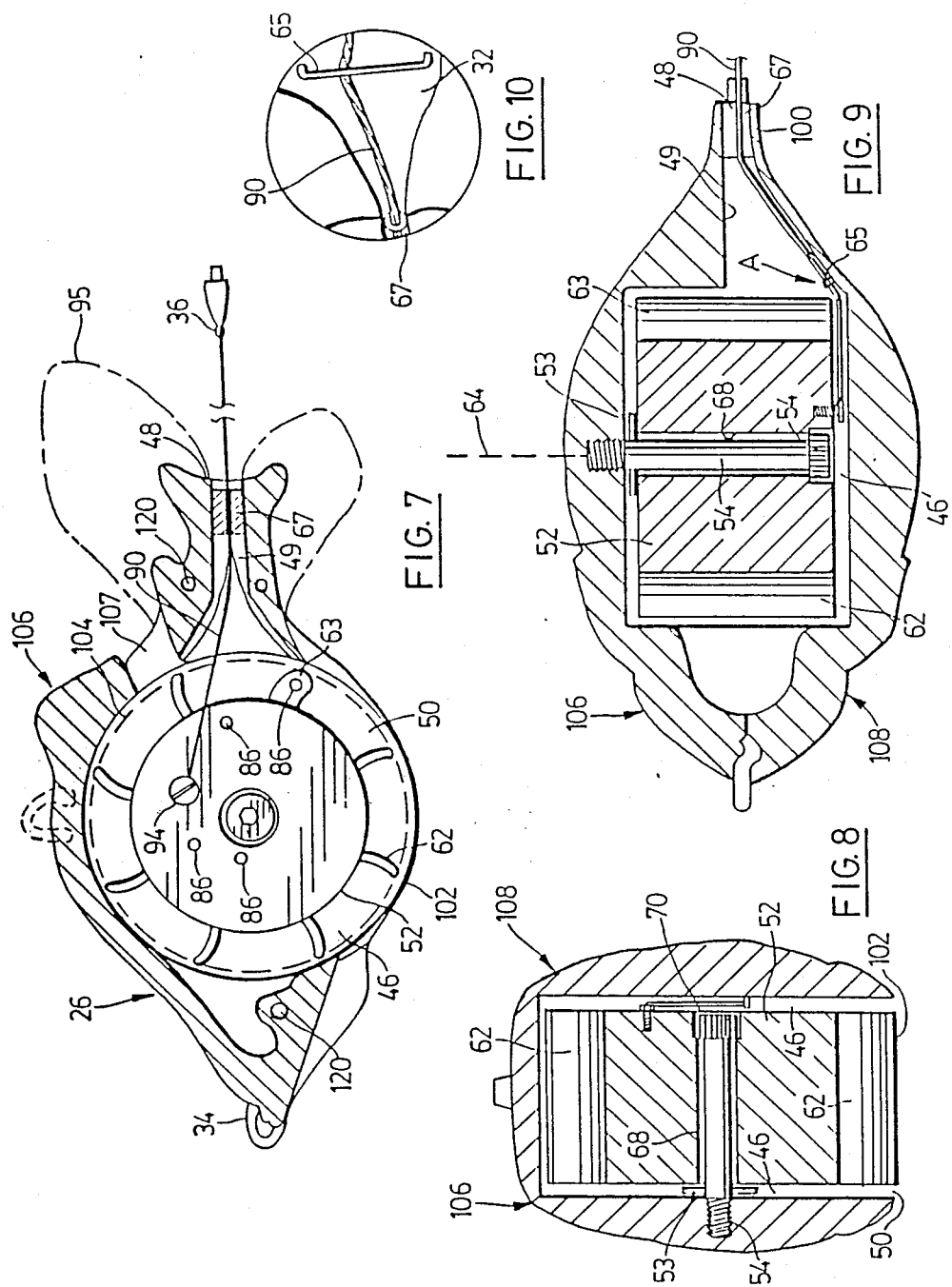

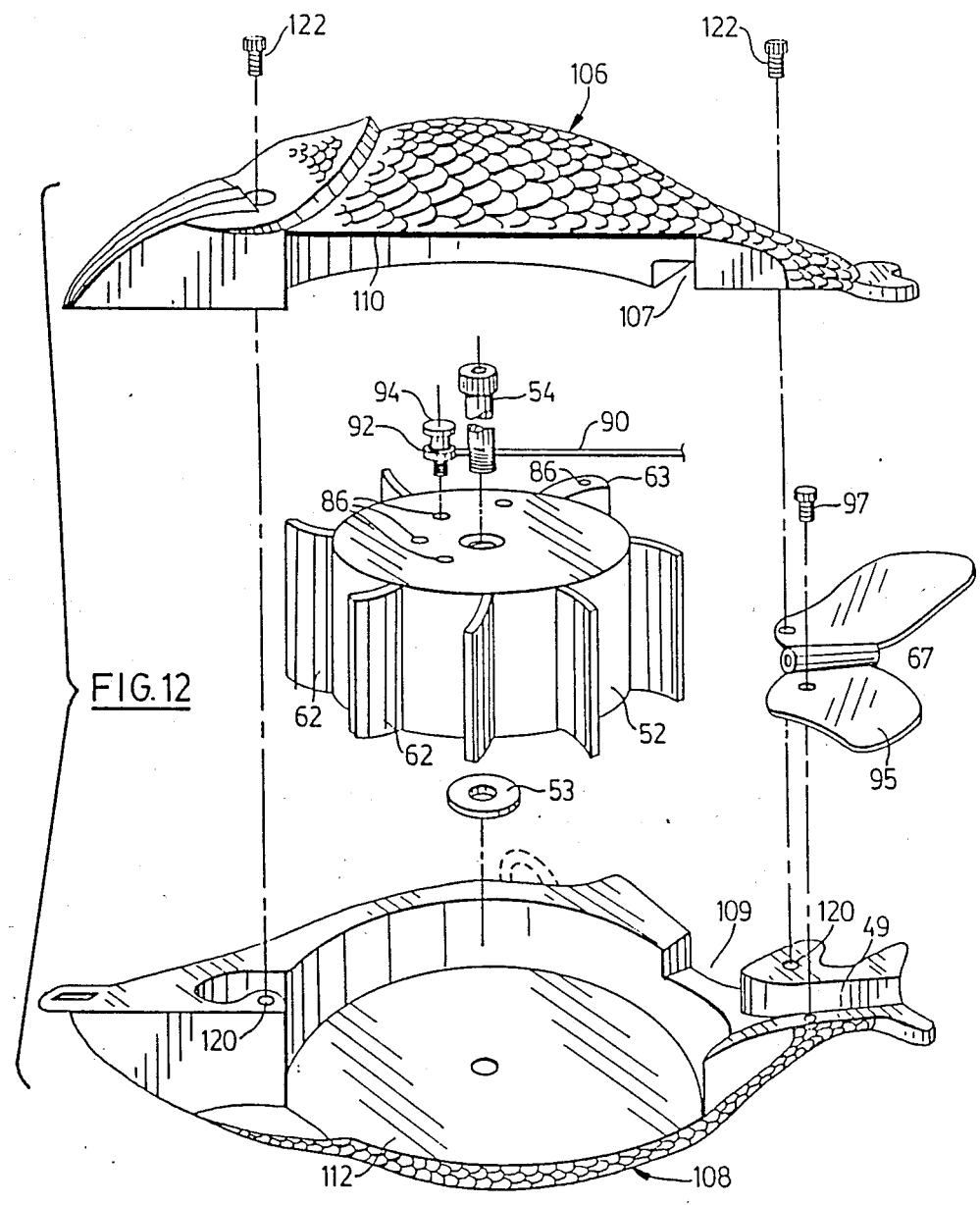

FISHING JIGGER

BACKGROUND OF THE INVENTION

This invention relates to a fishing jigger, more especially a jigger effective to jig or jerk a fish lure or bait back and forth in the water.

In one popular form of fishing, especially recreational or sport fishing, a fishing rod is employed having a fishing line extending downwardly into a body of water inhabited by fish, with a lure or bait on such line to attract the fish, and a fish hook associated with such lure or bait to hook a fish attempting to swallow the lure or bait.

In order to ensure that the fishing line extends downwardly, deeply into the body of water, a down-rigger is employed having a down-rigger rod and a long retaining line with a weight known in the art as a cannon ball, on its distal end to hold the retaining line generally vertically in the water. The fishing line is releasably connected to the retaining line a short distance from the lure or bait whereby the lure is held at a desired depth in the body of water corresponding generally to the point of releasable attachment to the retaining line.

When a fish is hooked, the frantic activity of the fish produces the necessary pulling force to release the fishing line from the retaining line and the fishing line can be wound in and the fish removed.

It is recognized in the fishing art that some fish are especially attracted by a moving lure or bait. Various fishing lures have been proposed having moving parts in an attempt to attract fish. U.S. Pat. No. 2,788,603, L. J. Lindemann, issued Apr. 16, 1957, teaches a lure having a movable tail and gills when drawn through the water. U.S. Pat. No. 2,952,935, C. C. Jordan, issued Sept. 20, 1960, teaches a lure in which a water wheel engages a cam mechanism to impart motion to wing elements whereby an insect or other natural prey of a fish is simulated. U.S. Pat. No. 2,517,495, J. M. Kneece, issued Aug. 1, 1950, teaches a lure having a paddle wheel rotor to move simulated fish eyes. U.S. Pat. No. 2,542,622, B. F. Bordner, issued Feb. 20, 1951, teaches a fish lure with side elements rotated by a paddle wheel to disturb the water.

Lures having actuating mechanisms to produce movement are also described in U.S. Pat. No. 3,077,698, M. I. Glass et al, issued Feb. 19, 1963; U.S. Pat. No. 3,973,350, W. C. England, issued Aug. 10, 1976; U.S. Pat. No. 4,536,985, R. J. Caviness, issued Aug. 27, 1985; and U.S. Pat. No. 3,465,464, J. F. De Berry, issued Sept. 9, 1969.

None of these prior patents is concerned with a fishing jigger for jigging the lure, rather they are concerned with the lure itself and effecting movement of parts of the lure.

Furthermore, a particular disadvantage of the prior lures is that the relatively complex structures must be sufficiently hardy to withstand damage which might result from the thrashing of the hooked fish, so that the lure can be used repeatedly, or the relatively complex structures must be disposable rendering them costly and uneconomic.

SUMMARY OF THE INVENTION

The present invention seeks to provide a fishing jigger for use with a fishing lure, which lure can be a conventional fishing lure.

The jigger of the invention is not subject to possible damage by a hooked fish and can be used repeatedly.

The present invention further seeks to provide a fishing jigger which will effect a desirable jigging of a fishing lure or bait.

The present invention also seeks to provide such a fishing jigger of relatively simple structure and which can be employed in conjunction with a down-rigger.

In accordance with one aspect of the invention a fishing jigger comprises a body member having a longitudinal axis and a transverse axis. A wheel cavity and a crank port are defined in the body member, the crank port communicates with the wheel cavity and extends along the longitudinal axis. A paddle wheel is mounted for rotation about the transverse axis, in the wheel cavity. A crank member is pivotally mounted on the paddle wheel eccentrically of the transverse axis, such that rotation of the paddle wheel about the transverse axis reciprocates the crank member relative to the port.

In another aspect of the invention there is provided a fishing apparatus incorporating a down-rigger assembly and a fishing rod assembly, with the lure of the fishing rod assembly being releasably attached to a fishing jigger of the invention which in turn is connected to the down-rigger line of the down-rigger assembly.

BRIEF DESCRIPTION OF THE DRAWINGS

The invention is illustrated in particular and preferred embodiments by reference to the accompanying drawings in which:

FIG. 7 is a vertical sectional view taken along line 7—7 of FIG. 6;

FIG. 8 is a vertical sectional view taken along line 8—8 of FIG. 4;

FIG. 9 is a horizontal sectional view taken along line 9—9 of FIG. 4;

FIG. 10 is an enlarged elevational view of a portion of the jigger looking in the direction of arrow "A" in FIG. 9;

FIG. 12 is an exploded perspective view of the fishing jigger of FIG. 4; and

DETAILED DESCRIPTION OF THE PREFERRED EMBODIMENT

Figure 1:
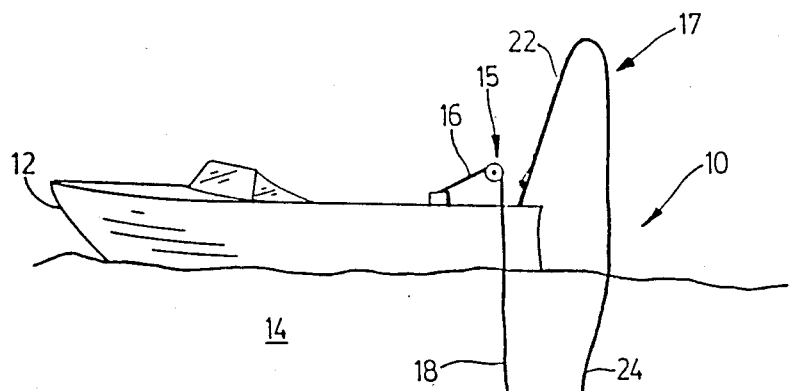
FIG. 1 is a diagrammatic view of a down-rigged fishing apparatus employing a jigger of the present invention.

With further reference to FIG. 1, a fishing apparatus 10 is supported from a boat 12 floating on a body of water 14.

Fishing apparatus 10 includes down-rigger assembly 15 and a fishing assembly 17.

Down-rigger assembly 15 includes a down-rigger rod 16 having a down-rigger retaining line 18 with a cannon ball 20 on the end thereof whereby down-rigger retaining line 18 extends substantially vertically downwardly into the depth of water 14.

Fishing assembly 17 includes a fishing rod 22 having a fishing line 24 and a lure 28. A jigger 26 is located between cannon ball 20 and lure 28 as described further below.

Figure 3:
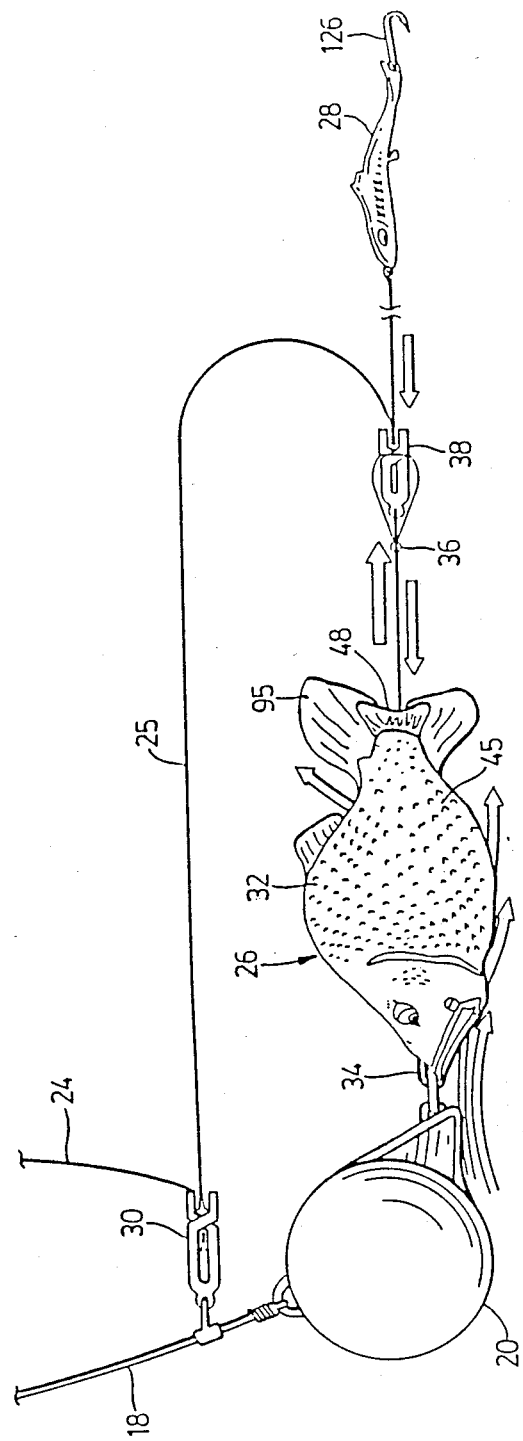
FIG. 3 is an enlarged view of the lower portion of the down-rigged fishing apparatus shown in FIG. 1.
Figure 4:
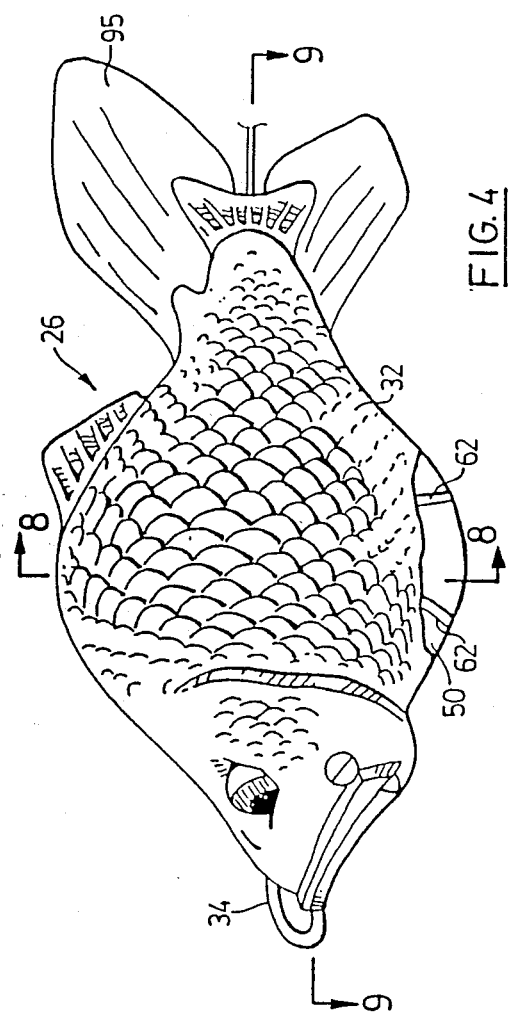
FIG. 4 is a side view, partly broken away, of the preferred embodiment of a fishing jigger according to the present invention.
Figure 6:
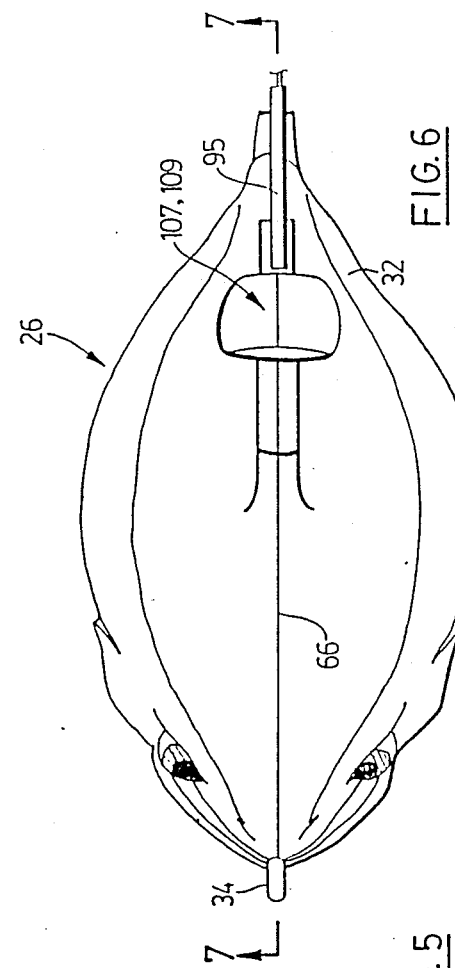
FIG. 6 is a plan view of the fishing jigger shown in FIG. 4.

As more particularly shown in FIG. 3, a retainer or release 30 releasably attaches fishing line 24 to down-rigger retaining line 18 in the vicinity of cannon ball 20.

The jigger 26 comprises a body 32 suitably simulating a fish, having a front eye hook 34 by means of which body 32 is attached to cannon ball 20, and a reciprocating eye hook 36 to which is connected a retainer or release 38.

A portion 25 of fishing line 24 extending between retainer or release 30 and lure 28 is releasably engaged by retainer or release 38.

The cannon ball 20 represents a weighted body, for example of lead, which serves to hold down-rigger retaining line 18 generally vertically downwardly so that the lure 28 is maintained at a desired depth in water 14.

Figure 2:
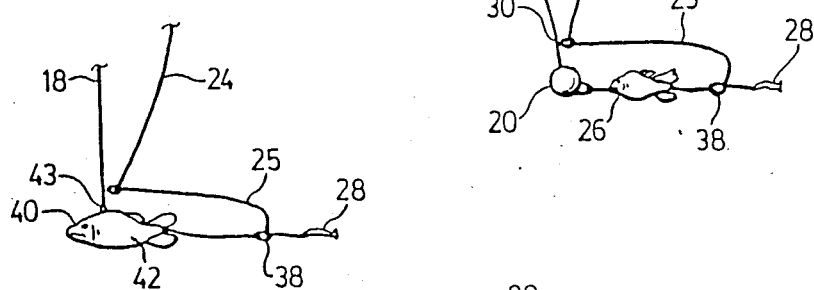
FIG. 2 is a diagrammatic view of an alternative embodiment of the invention.
Figure 11:
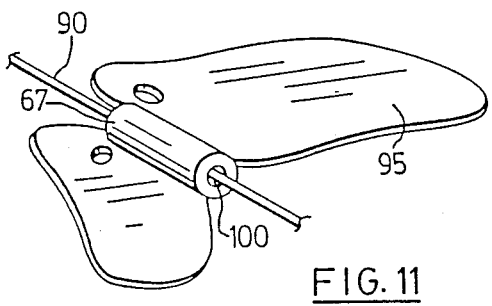
FIG. 11 is a perspective view of the stabilizer of the embodiment of FIG. 4.

With further reference to FIG. 2 there is shown an alternative embodiment of the invention in which a weighted jigger 40 functions both as jigger and cannon ball. Jigger 40 has a weighted body 42 and a top eye hook 43. Top eye hook 43 is connected to the down-rigger retaining line 18 and the fishing line 24 including the portion 25 and lure 28 is connected in the same manner as described with reference to FIGS. 1 and 3.

With particular reference to FIGS. 4 to 12 and especially FIGS. 7 to 12, the jigger 26 has a body 32 in which is defined a wheel cavity 46. A crank port 48 forms an opening to body 32 and communicates with wheel cavity 46 via a crank passage 49.

A paddle slot 50 in the underside of body 32 provides an opening to wheel cavity 46, and a paddle wheel 52 is rotatably housed in wheel cavity 46.

Figure 5:
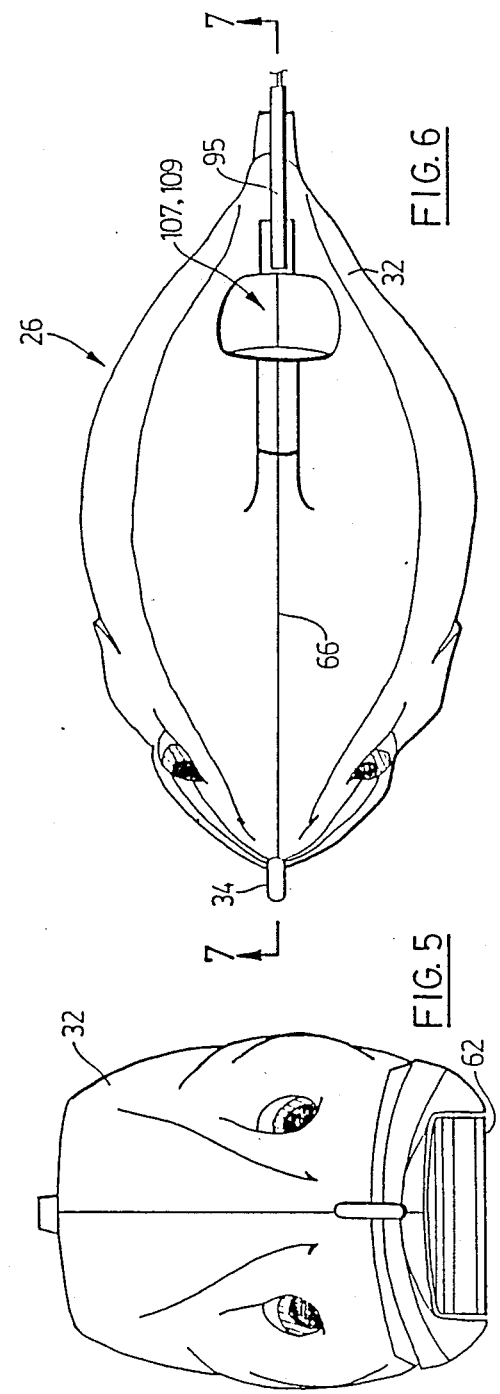
FIG. 5 is a front view of the fishing jigger shown in FIG. 4.

With particular reference to FIGS. 5, 9 and 12, the paddle wheel 52 is mounted in wheel cavity 46 by means of a shoulder bolt or cap screw which forms an axle 54 located in transverse bore 68 of paddle wheel 52. A washer 53 spaces paddle wheel 52 from the wall of body 32. Paddle wheel 52 includes a plurality of radial paddles 62, including an enlarged paddle 63, the purpose of which will be described below.

Body 32 has a transverse axis 64 and a longitudinal axis 66 with axle 54 extending along the transverse axis 64. The paddles 62, 63 are spaced generally equally about paddle wheel 52.

Paddle wheel 52 has a plurality of threaded recesses 86 located at different radial distances from transverse axis 64. A crank wire 90 has a mounting ring 92 (see FIG. 12) rotatably located on a shoulder bolt or cap screw 94, which in turn is screwed into one of the threaded recesses 86. Crank wire 90 is formed of metal wire but it could be made of other suitable plastic material if desired and for the purpose of this disclosure, the term "wire" is intended to include any suitable flexible line. It will be appreciated that the stroke of crank wire 90 can be varied by choosing a different recess 86. It will also be noted that one of the recesses 86 is located in enlarged paddle 63. This gives the maximum stroke possible to crank wire 90.

A stabilizer 95 (see FIG. 11) is mounted in body 32 by a countersunk flat head self-tapping screw or bolt 97.

Referring in particular to FIG. 10, a guide bar 65 is mounted on the inside wall of body 32 to keep crank wire 90 away from the rotating paddle wheel 52. A rear guide member 67 forming part of stabilizer 95 is located in crank passage 49 to define a narrow elongate guide passage 100 for crank wire 90.

The paddles 62 have outer ends 102 disposed along a circumferential path 104.

With particular reference to FIG. 12, body 32 is formed from opposed body shells 106 and 108. Body shell 106 has a cavity wall 110 and body shell 108 has a cavity wall 112. Body shells 106, 108 have respective mating recesses 107, 109 forming an opening in body 32 to relieve the back pressure of the water flowing around paddle wheel 52.

The assembly of the jigger 26 is particularly illustrated by reference to FIG. 12. Paddle wheel 52 is mounted in body shell 108 using cap screw 54 after putting washer 53 on cap screw 54 below paddle wheel 52. Stabilizer 95 is then mounted on body shell 108 using bolt 97. Crank wire 90 is passed through stabilizer guide member 67 and cap screw 94 is passed through crank wire mounting ring 92 and threaded into a selected recess 86. The top body shell 106 is then secured to body shell 108 using bolts 122 threaded into respective threaded holes 120.

In use the jigger 26 is assembled as part of fishing apparatus 10 as generally illustrated in FIGS. 1 and 3.

The flow of water in the mass of water 14, which flow is generally indicated by the arrows in FIG. 3, engages paddles 62, 63 in paddle slot 50 (and thus along circumferential path 104), resulting in rotation of paddle wheel 52 about transverse axis 64.

The rotation of paddle wheel 52 results in a corresponding rotation of the eccentrically located screw or bolt 94 about transverse axis 64, carrying with it the crank wire 90. This rotary motion of the bolt 94 results in a reciprocating, to and fro motion in crank wire 90 which is translated through reciprocating eye hook 36 to lure 28 along longitudinal axis 66, whereby the lure 28 is reciprocated or jigged to and fro to simulate the movement of a small fish.

As can be particularly seen in FIG. 3, lure 28 has a fish hook 126 and when a fish attracted by the jigging lure 28 attempts to engulf lure 28 it is hooked by fish hook 126. The frantic or thrashing movements of the hooked fish provide a pulling force which results first in release of line portion 25 from retainer or release 38 and subsequently release of line 24 from retainer or release 30, whereby fishing line 24 is completely released from the down-rigger retaining line 18 and the jigger 26, and the hooked fish can thus be reeled in by means of fishing rod 22.

It will be understood that bushings of conventional type may be included between axle 54 and bore 68 to facilitate the rotation of the paddle wheel 52.

Figure 13:
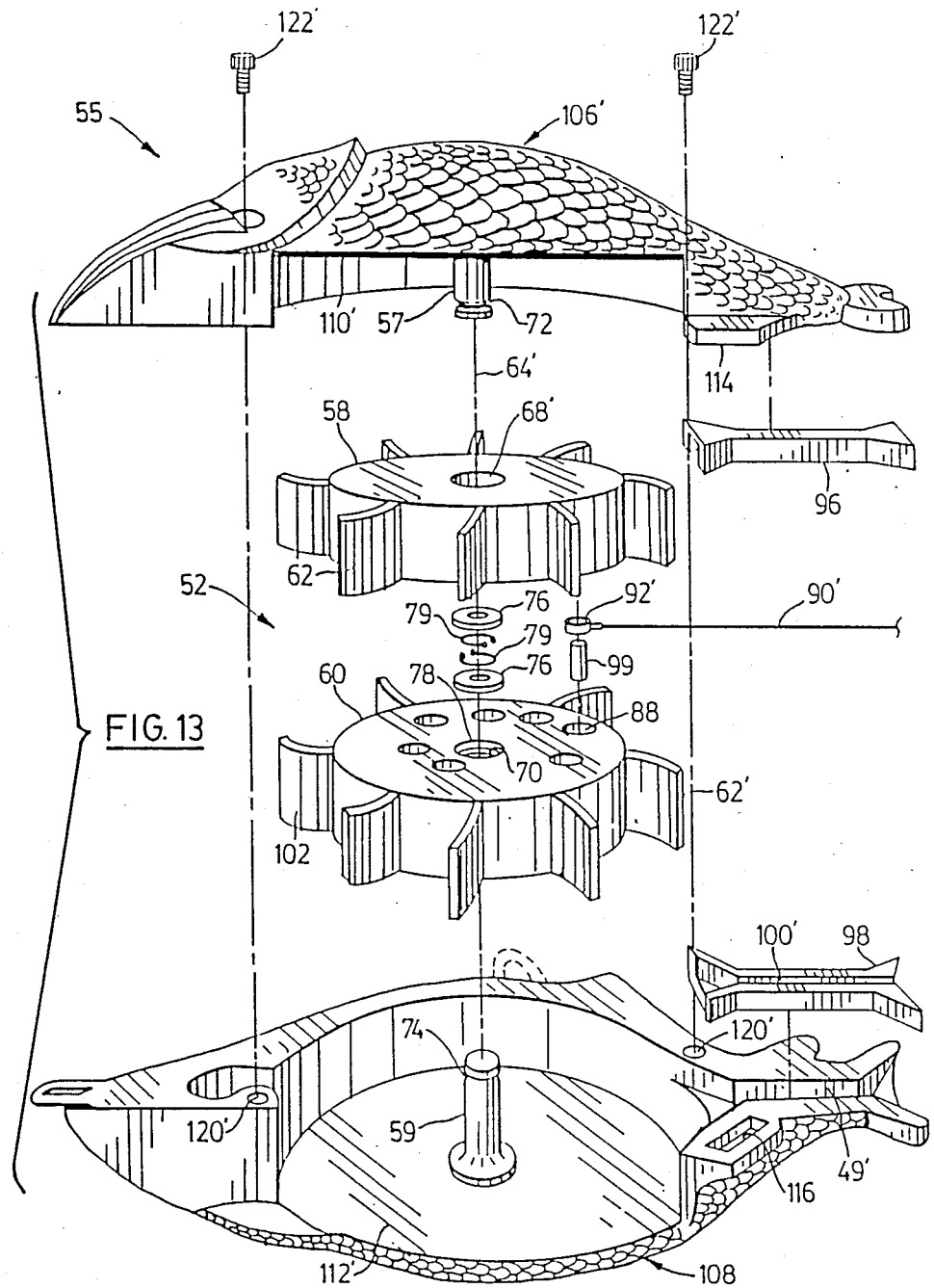
FIG. 13 is an exploded perspective view similar to FIG. 12 showing another embodiment of a fishing jigger according to the present invention.

Referring next to FIG. 13, another embodiment of a fishing jigger is generally indicated by reference numeral 55. Jigger 55 is similar to jiggers 26 and 40 except that it has a split paddle wheel, and primed reference numerals are used in FIG. 13 to indicate parts which are similar to those shown in FIGS. 2 to 12.

In jigger 55, paddle wheel 52' comprises a pair of wheel discs 58, 60 in spaced-apart facing relationship. Spindles or axles 57 and 59 are mounted in respective body shells 106' and 108' and extend along transverse axis 64'. Radial paddles 62' are circumferentially spaced apart around wheel discs 58, 60.

Wheel disc 58 has a bore 68' to receive spindle 57 and wheel disc 60 has a bore 70 to receive spindle 59. Axles or spindles 57, 59 have respective annular grooves 72, 74 adjacent to their distal ends.

Wheel disc 60 has an annular cavity 78 about bore 70 and wheel disc 58 has a similar annular cavity (not shown) about bore 68', and washers 76 and c-shaped snap rings 79 are seated in grooves 72, 74 to retain wheel discs 58, 60 in position.

Wheel discs 58, 60 have a plurality of opposed recesses 88 in registration, and a pin 99, on which mounting ring 92' of crank wire 90' is rotatably mounted, is located in a selected pair of opposed recesses 88.

Guide members 96 and 98 may optionally be located in crank passage 49' to define a narrow elongate guide passage 100' for crank wire 90'.

A weight cavity 114 is defined in body shell 106' and a similar weight cavity 116 is defined in body shell 108'.

The assembly of jigger 55 is similar to that of jigger 26 except that wheel discs 58, 60 slide onto spindles 57, 59 and washers 76 and snap rings 79 are fitted on annular grooves 72, 74 so as to permit limited axial movement of wheel discs 58, 60 on spindles 57, 59.

Mounting ring 92' of crank wire 90' slides onto mounting pin 99, prior to the opposed ends of mounting pin 99 being fitted into a selected pair of opposed recesses 88 of wheel discs 58 and 60. It will be recognized that in order to achieve this the body shells 106' and 108' with their assembled wheel discs 58 and 60 respectively are brought into opposed relationship.

Each pair of recesses 88 in registration is located at a different radial distance from the transverse axis 64', and therefore the choice of a particular pair of recesses 88 determines the length of stroke of crank wire 90' desired, or in other words, the jigging effect desired.

It will be evident from FIG. 13 that as part of the assembly, the guide members 96 and 98, if employed, are inserted in opposed relationship, and a weight may be introduced into one or both of weight cavities 114 and 116.

In order to complete the assembly, screws 122' are introduced into screw threaded holes 120' as shown in FIG. 13.

During rotation of paddle wheel 52', the mounting ring 92' of crank wire 90' may pivot about mounting pin 99, and mounting pin 99 may likewise pivot within the opposed recesses 88; it will be understood that the crank wire 90' may either be a flexible wire, or may be in the form of a rigid rod.

The jigger 40 of FIG. 2 may have substantially the same structure as illustrated in FIGS. 7 to 12 or FIG. 13, differing only in that it is fabricated of a heavy material or is sufficiently weighted that it will function as a cannon ball for down-rigger retaining line 18.

Thus by means of the present invention a desired jigging of a lure or bait is readily achieved even at a significant depth of water, to provide greater appeal for a fish to be hooked.

We claim:

1. A fishing jigger comprising:
   a body member having a longitudinal axis and a transverse axis;
   said body member having a wheel cavity communicating with the exterior of body said member;
   the body member also having a crank port communicating with said wheel cavity and extending along said longitudinal axis;
   a paddle wheel mounted for rotation about said transverse axis in said wheel cavity; and
   a crank member pivotally mounted on said paddle wheel eccentrically of said transverse axis, such that rotation of said paddle wheel about said transverse axis reciprocates said crank member relative to said port.

2. A jigger according to claim 1, wherein said crank member extends outwardly of said body member through said crank port.

3. A jigger according to claim 2, wherein said paddle wheel has a plurality of radial paddle members spaced from said transverse axis, and said body member has a paddle slot therein communicating with said wheel cavity, said paddle members having outer ends travelling along a circumferential path of travel in said slot during rotation of said paddle wheel.

4. A jigger according to claim 2, wherein said paddle wheel has a wheel body comprising a pair of wheel discs,
   axle means bearingly mounting said wheel discs in adjacent spaced apart relationship to define a space therebetween,
   mounting means for pivotal mounting of said crank member in said space, said mounting means being spaced from said transverse axis.

5. A jigger according to claim 1 wherein said paddle wheel includes means for pivotally mounting the crank at different radial distances from said transverse axis.

6. A jigger according to claim 3 wherein said paddle wheel includes means for pivotally mounting the crank at different radial distances from said transverse axis.

7. A jigger according to claim 4 wherein said paddle wheel includes means for pivotally mounting the crank at different radial distances from said transverse axis.

8. A jigger according to claim 1 wherein said crank member is an elongate wire and further comprising guide means located in said body to prevent the crank from rubbing on the paddle wheel.

9. A jigger according to claim 3 wherein said crank member is an elongate wire and further comprising guide means located in said body to prevent the crank from rubbing on the paddle wheel.

10. A fishing jigger comprising:
    a body member having a longitudinal axis and a transverse axis;
    said body member defining a wheel cavity communicating with the exterior of the body member, said cavity having first and second opposed side walls;
    the body member also having a crank port communicating with said wheel cavity and extending along said longitudinal axis;
    a first axle member fixedly mounted on said first side wall and a second axle member fixedly mounted on said second side wall; said first and second axle members extending towards each other along said transverse axis;
    a paddle wheel comprising first and second wheel discs bearingly mounted on said first and second axles, respectively, in spaced apart relationship to define a gap therebetween;
    a plurality of radial paddle members extending outwardly of each of said first and second wheel discs and spaced from said transverse axis, said paddle members having outer water impacting ends travelling along a circumferential path of travel about said transverse axis during rotation of said paddle wheel;

said body member having a paddle slot communicating with said wheel cavity for travel of said water impacting ends therethrough during rotation of said paddle wheel;

a crank member pivotally mounted on said paddle wheel in said gap, eccentrically of said transverse axis, and extending outwardly of said body member through said crank port, such that rotation of said paddle wheel about said transverse axis reciprocates said crank member relative to said port.

11. A jigger according to claim 10, said crank member comprising an elongate crank element having an end mounting ring;

a mounting pin extending through said ring, said pin having opposed ends housed in a pair of opposed pin receiving recesses in said first and second wheel discs.

12. A jigger according to claim 11, said crank element comprising an elongate rod.

13. A jigger according to claim 11, said crank element comprising an elongate wire.

14. A jigger according to claim 11, comprising a plurality of opposed pairs of said pin receiving recesses, each pair being at a different radial distance from said transverse axis.

15. A jigger according to claim 13, comprising a plurality of opposed pairs of said pin receiving recesses, each pair being at a different radial distance from said transverse axis.

16. A jigger according to claim 11, wherein said crank element terminates at an eye hook at an outer end remote from said mounting ring.

17. A jigger according to claim 13, wherein said crank element terminates at an eye hook at an outer end remote from said mounting ring.

18. A fishing apparatus comprising:
a down-rigger having a down-rigger rod and a weighted down-rigger line and a fishing rod with a fishing line,
a jigger as defined in claim 1 connected to a lower end of said down-rigger line,
a lure on an outer end of said fishing line, said outer end being releasably attached to said crank member for reciprocating movement therewith,
an intermediate portion of said fishing line being adjacent said outer end being releasably connected to said down-rigger line.

19. A fishing apparatus comprising:
a down-rigger having a down-rigger rod and a weighted down-rigger line and a fishing rod with a fishing line,
a jigger as defined in claim 10 connected to a lower end of said down-rigger line,
a lure on an outer end of said fishing line, said outer end being releasably attached to said crank member for reciprocating movement therewith,
an intermediate portion of said fishing line being adjacent said outer end being releasable connected to said down-rigger line.

* * * * *